Figure 5:
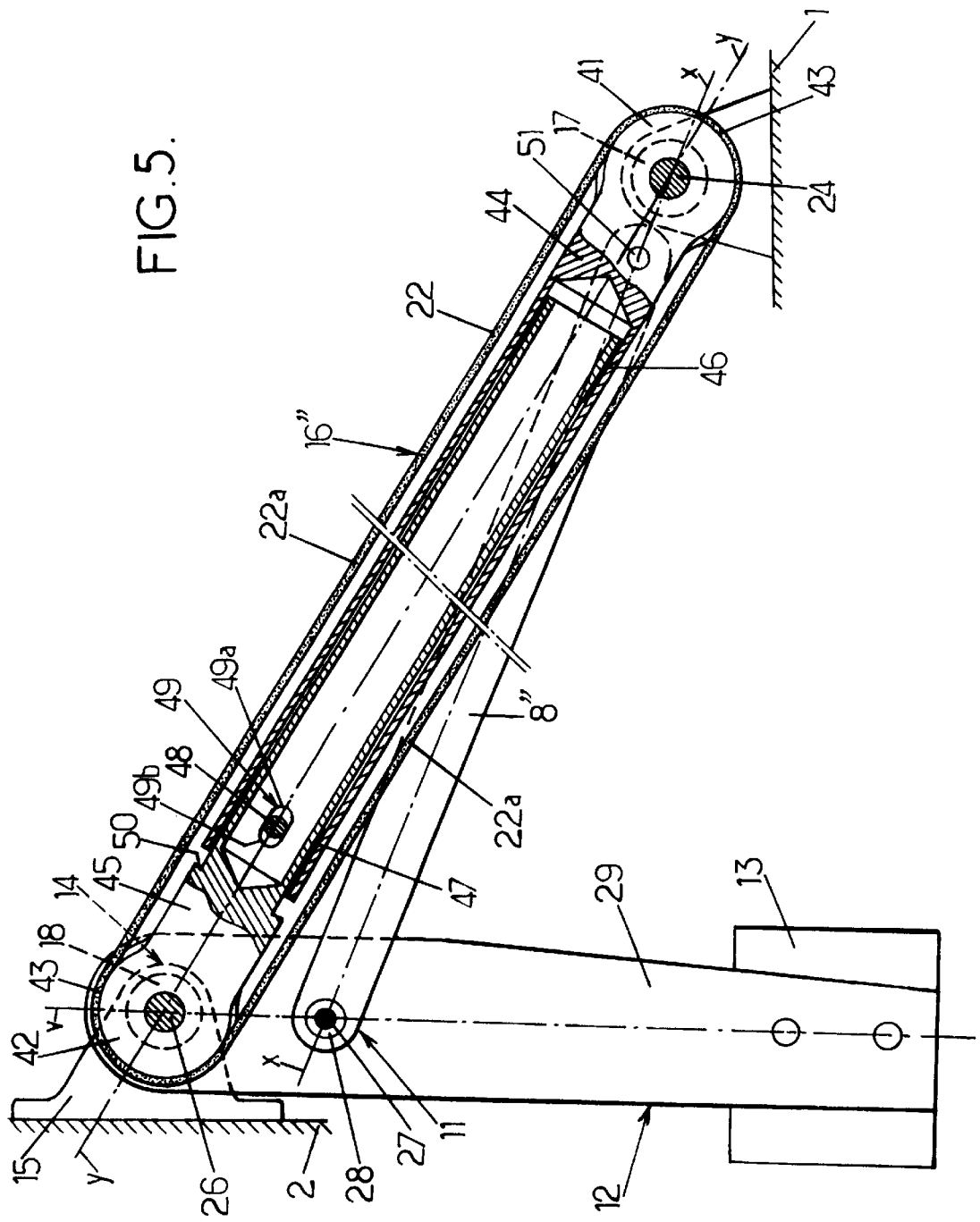

United States Patent
Certain

Patent Number: 6,145,785
Date of Patent: Nov. 14, 2000

[54] SIMPLIFIED ANTI-VIBRATION SUSPENSION DEVICE WITH TOP DAMPERS FOR A HELICOPTER

[75] Inventor: Nicholas Certain, Aix En Provence, France

[73] Assignee: Eurocopter, France

[21] Appl. No.: 09/298,499

[22] Filed: Apr. 22, 1999

[30] Foreign Application Priority Data

Apr. 23, 1998 [FR] France .................................. 98 05093

[51] Int. Cl.[7] .................................................. B64C 27/00
[52] U.S. Cl. .................................. 244/17.27; 244/17.11; 416/500; 188/379; 248/559
[58] Field of Search ........................... 244/17.27, 17.11; 416/500; 188/379; 248/559

[56] References Cited

U.S. PATENT DOCUMENTS

| | | | |
|---|---|---|---|
| 3,945,628 | 3/1976 | Halwes | 267/152 |
| 4,431,148 | 2/1984 | Mouille | 244/17.27 |
| 4,458,862 | 7/1984 | Mouille | 244/17.27 |
| 4,766,984 | 8/1988 | Gaffey et al. | 244/17.27 |
| 4,974,794 | 12/1990 | Aubry et al. | 244/17.27 |
| 5,118,051 | 6/1992 | Sheehy et al. | 244/17.27 |
| 5,190,244 | 3/1993 | Yana | 244/17.27 |
| 5,782,430 | 7/1998 | Mouille | 244/17.27 |
| 5,788,182 | 8/1998 | Guimbal | 244/17.27 |
| 5,813,626 | 9/1998 | Zoppitelli et al. | 244/17.27 |

*Primary Examiner*—J. Woodrow Eldred
*Attorney, Agent, or Firm*—Piper Marbury Rudnick & Wolfe

[57] ABSTRACT

The anti-vibration suspension device includes at least three diagonal bars each articulated on the structure and on the transmission box by means of a rigid lever supporting a damping weight and itself articulated at least by pivoting on this box, and, for each diagonal bar, a tension bar also articulated on the structure and on the transmission box, the corresponding lever being articulated on the box while being articulated by at least pivoting on the upper end part of the corresponding tension bar, which is flexible in tension.

22 Claims, 4 Drawing Sheets

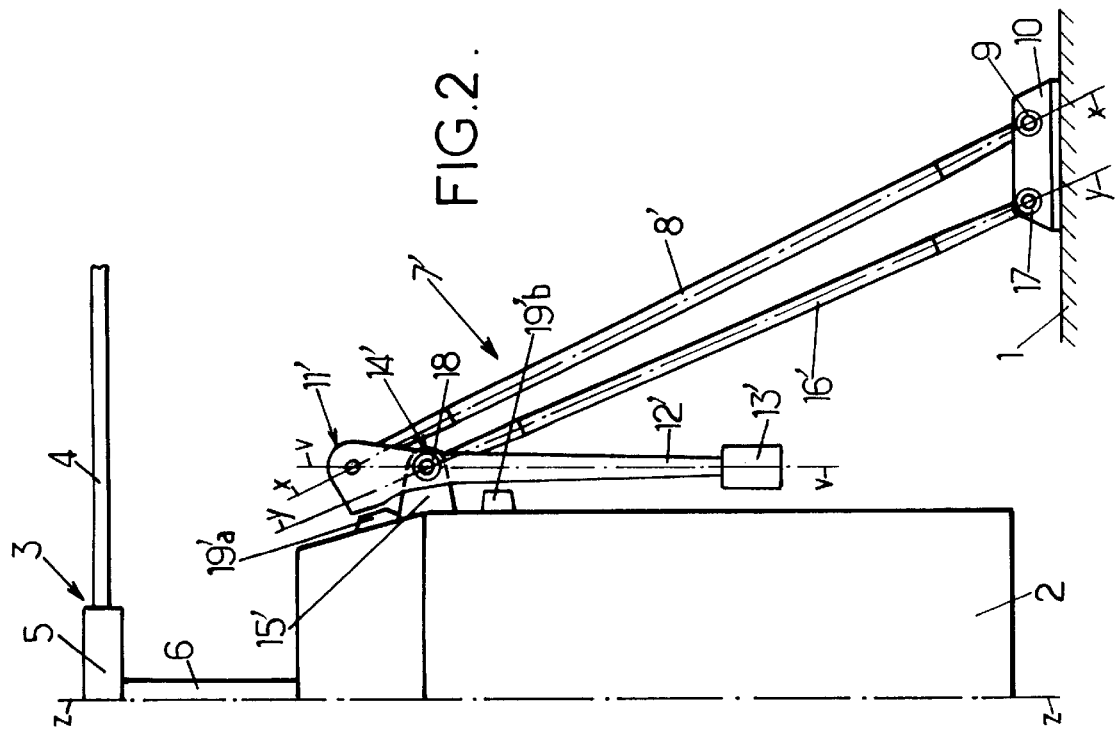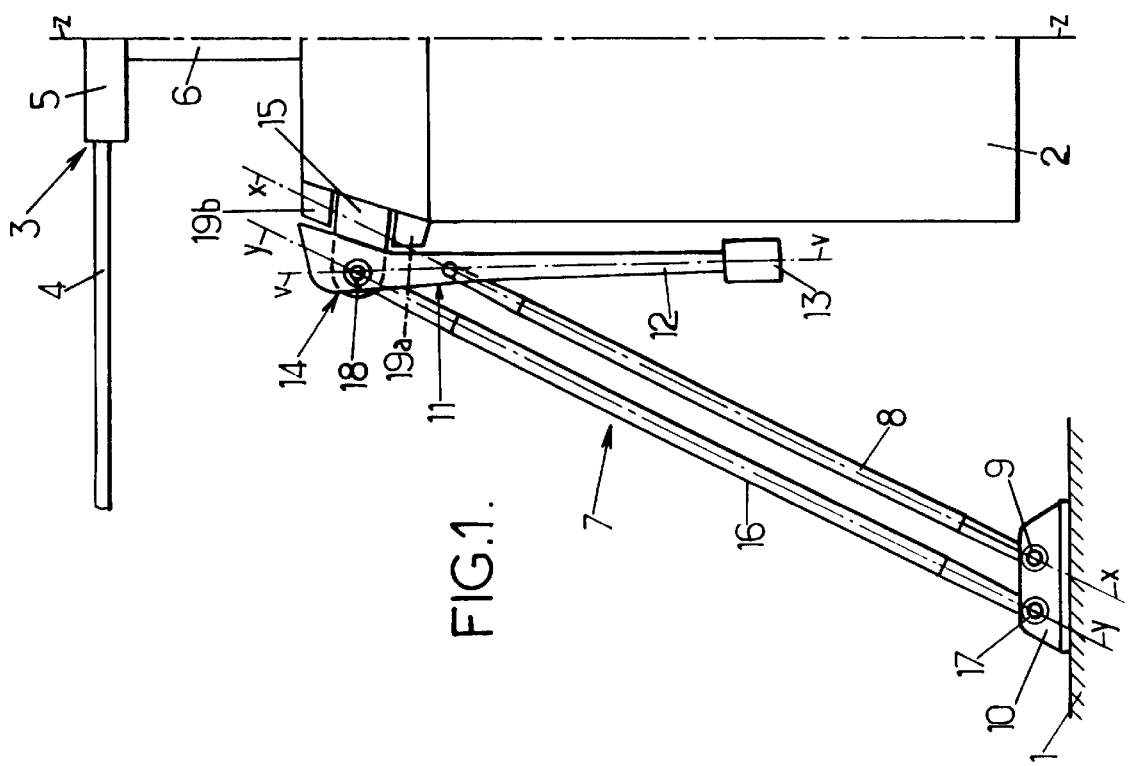

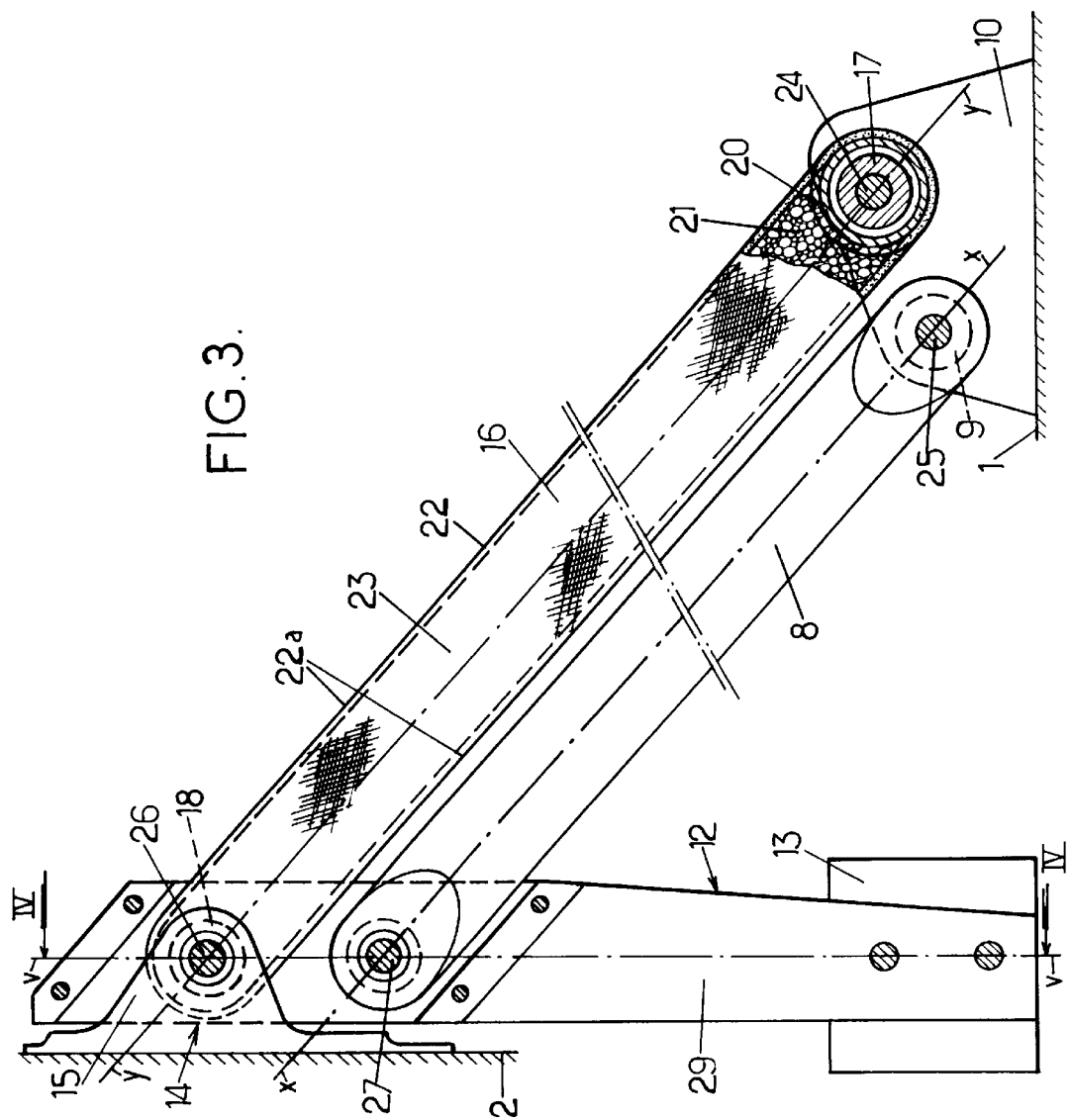
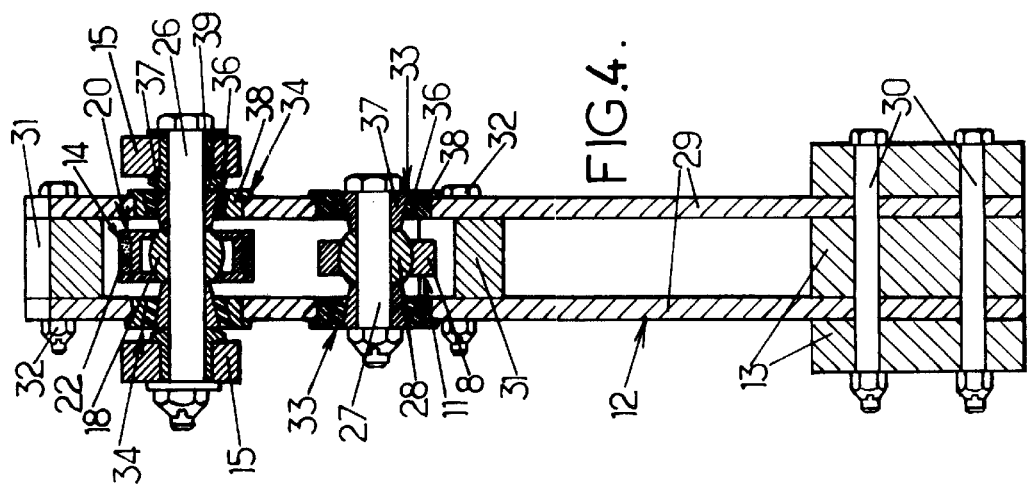

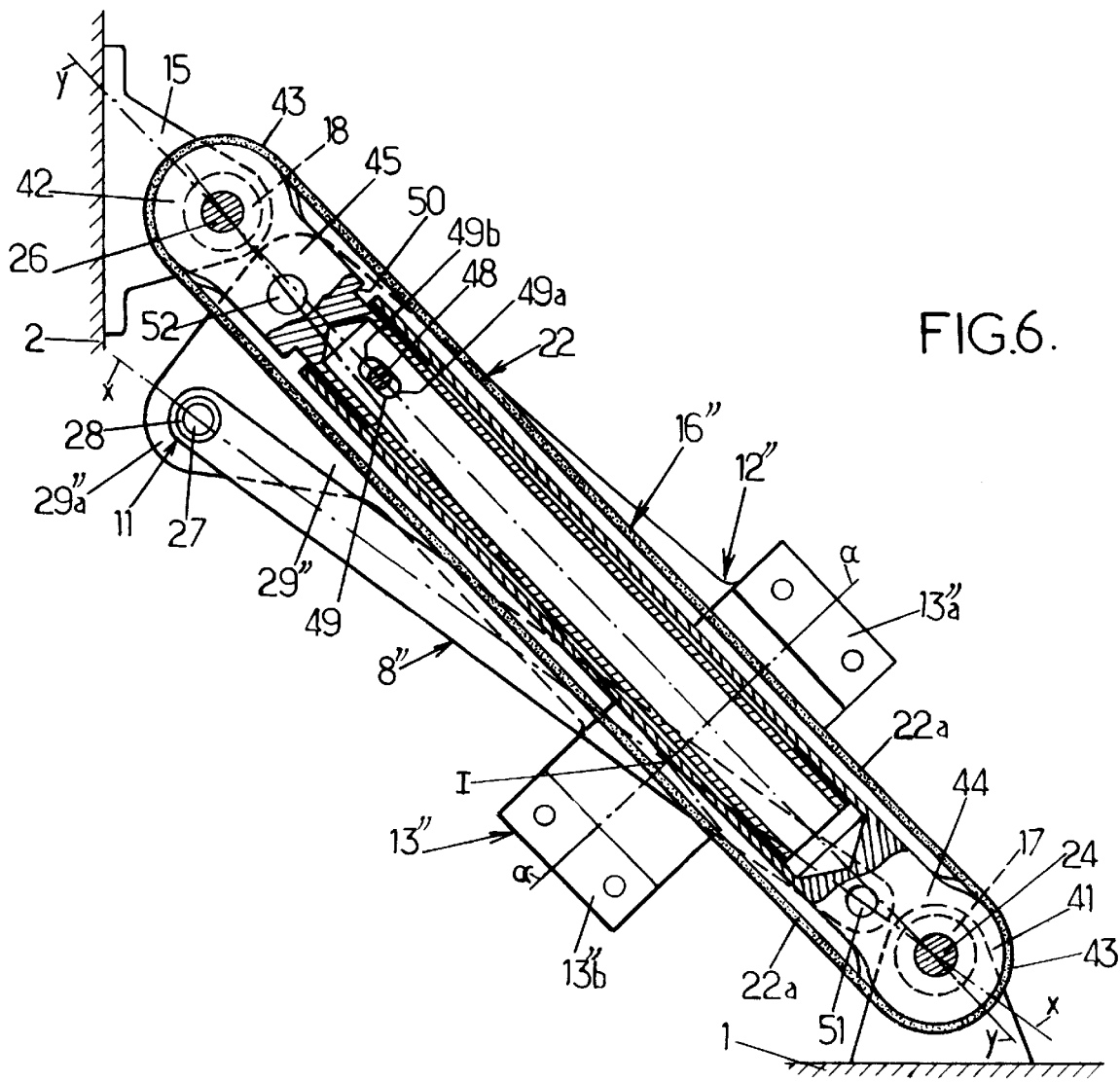
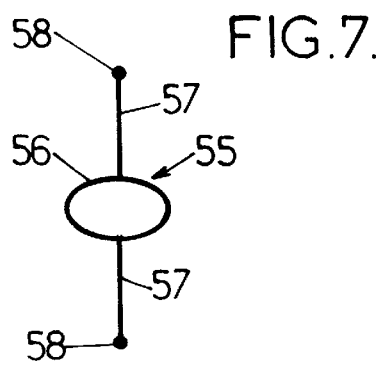
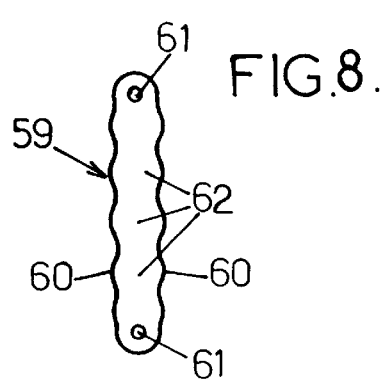

SIMPLIFIED ANTI-VIBRATION SUSPENSION DEVICE WITH TOP DAMPERS FOR A HELICOPTER

The invention concerns an anti-vibration, or anti-resonance, suspension device, for a helicopter main rotor including a rotor mast rotated, by a main transmission box, around the mast axis, which is the axis of rotation of the rotor. Such an anti-vibration suspension device is intended to be fitted to a helicopter whose structure generally supports, on a transmission support platform on top of the fuselage, a power unit, the main rotor and the main transmission box, acting as a reduction gear box and located between the power unit and the main rotor to rotate the latter. Such an anti-vibration suspension device is therefore interposed between the main transmission box and the helicopter structure to, on the one hand, provide the transmission between the rotor and the structure of the static forces and moments acting upon the rotor, and, on the other hand, to provide effective damping or filtering of the dynamic components of the forces and moments acting upon the rotor, and in particular the dynamic component of the force directed along the rotor axis (surge) and the force and moment excitations in the rotor plane.

The invention relates more particularly to an anti-vibration suspension device of the so-called "top damper" type and including a group of at least three rigid diagonal bars supporting the transmission box on the helicopter structure, these diagonal bars being distributed around the transmission box and inclined on the rotor axis so as to converge towards each other and substantially towards a point of the rotor axis, generally in the direction of their upper ends and so that the convergence point is located between the hub, at the centre of the rotor, and the upper part of the transmission box, these diagonal bars being connected in an articulated way, on the one hand, to the helicopter structure by their lower ends, and, on the other hand, to the transmission box by their upper ends and by means of rigid levers, equal in number to the diagonal bars, each lever pointing substantially from the top of the transmission box and from the upper end of the corresponding diagonal bar towards the base of said box and/or towards the lower end of said diagonal bar, each lever supporting at least one damping weight at its lower end and being connected in an articulated way to the transmission box by its upper end part, on which the upper end of the corresponding diagonal bar is articulated, the articulations connecting each lever to said box and to the corresponding diagonal bar being articulations at least pivoting around axes substantially perpendicular to a corresponding radial plane passing through the rotor axis and through the longitudinal axis of the corresponding diagonal bar.

A suspension device of this type is known from FR 2 669 982, wherein each diagonal bar is articulated by its lower end directly on the helicopter structure, and by its upper end at the upper end of one of arms respectively, equal in number to the diagonal bars, and placed substantially vertically around the transmission box, to the base of which these arms are connected. Each arm is articulated at the upper part of the transmission box in the rigid area of its upper end to which the corresponding rigid lever is fixed or integral by its upper end.

In FR 2 669 982, each arm constitutes, with the corresponding lever and damping weight, a mono-directional anti-resonance part placed in the vertical position around the transmission box, at the junction of the upper end of the corresponding diagonal bar with said box. Each arm is placed in a radial plane defined by the rotor axis and the axis of the corresponding diagonal bar, and its longitudinal axis extends along a direction substantially parallel to the rotor axis, and each arm, formed by a single elongated part or an assembly, constitutes by its lower part a flexible blade in this radial plane, the lower end of which is articulated on a side fitting of the base of the transmission box. The articulations of each arm enable clearances by bending, perpendicularly to the rotor axis, of its part forming a flexible blade, and the assembly of the corresponding lever and its damping weight forms a top positioned damper, acting by inertia and developing inertia forces which counterbalance the reactions at the connection points to the transmission box which correspond to the bending of the flexible parts of the arm.

Furthermore, and as in the anti-resonance device according to FR 2 499 505, with low positioned dampers and on which FR 2 669 982 proposes an improvement, a flexible suspension plate, independent of the arms and dampers and constituted by a circular ring membrane fixed under the base of the transmission box and to the structure, is able to bend under forces exerted perpendicularly to its plane, along the rotor axis, or pivoting moments exerted around its centre by the transmission box, but is rigid in tension/compression under forces and moments exerted in its plane, such as rotor drive reaction torque, this membrane integrating with the upper structure of the fuselage.

The configuration according to FR 2 669 982 involves the use, for the connection between the lower end of each flexible arm and the base of the transmission box, of a complex laminated support bearing, which allows rotation around an axis perpendicular to the radial plane containing this arm and allows unwanted motion of the lower end of the flexible arm along its longitudinal axis, when this arm is bending under strain. This configuration also involves the use of flexible arms the dimensioning and manufacture of which are difficult. Moreover, the fixing between the rigid lever and the corresponding vertical arm can cause problems of fretting.

The problem at the root of the invention is to simplify an anti-vibration suspension device of the type with top dampers, known through FR 2 669 982, particularly by the elimination of the flexible bending arms and their complex support bearing on the base of the transmission box, so as to obtain very substantial reductions in the costs of manufacture, installation, and maintenance, while retaining the advantages of a device with top dampers according to FR 2 669 982 compared with a device with low dampers according to FR 2 499 505, these advantages stemming essentially from the static setting of the suspension and from the vibration filtering properties, these advantages being given in detail in FR 2 669 982 to which reference may be made for more detail on this subject.

A further purpose of the invention is to propose a simplified antivibration suspension device with top dampers, which remains compatible with the use of a membrane according to FR 2 669 982 or FR 2 499 505, to provide the take up of the reaction to the drive torque and of the shear forces on the base of the transmission box while obtaining the required degrees of freedom of surge and rotation, the simplified device of the invention being simultaneously and advantageously compatible with mono- or bi-directional suspensions including a pair of identical parallel small rods articulated between the base of the transmission box and the structure, as described in FR 2 728 538 and FR 2 728 539, allowing additional cost savings compared with the use of a membrane.

To this end, the invention proposes an anti-vibration suspension device, of the type introduced above, and which is characterised in that it includes additionally, for each diagonal bar, a tension bar, flexible in tension, also inclined on the rotor axis in the corresponding radial plane so that the tension bars converge towards each other in the direction of their upper ends, each tension bar being articulated by its upper end on the transmission box and by its lower end on the helicopter structure, and the corresponding lever is connected in an articulated way to said box while being articulated, at least pivoting around an axis substantially perpendicular to said corresponding radial plane, on the upper end part of the tension bar.

The advantage of such a device, wherein the tension bars transmit static and dynamic forces, and the diagonal bars, of conventional structure, transmit dynamic forces, is to replace each flexible arm and each support bearing of prior art devices by a tension bar which is much easier to dimension, manufacture, assemble and maintain than the components it is replacing, in a device of thereby simplified architecture.

Each tension bar may be substantially parallel to the corresponding diagonal bar, in which case it is to advantage practical for the lower ends of the tension bar and of the corresponding diagonal bar to be articulated on the structure by two separate ball joint articulations.

But it is also possible for each tension bar and the corresponding diagonal bar to be inclined towards each other, in the direction of one of their ends, in which case, according to a straightforward version facilitating the articulation to the structure, the lower end of the diagonal bar or tension bar respectively is articulated on the structure at least by pivoting around a pivot pin passing through an articulation ball joint of the lower end of the tension bar or corresponding diagonal bar respectively on the structure. The lower ends of the two diagonal and tension bars respectively are thus articulated on the structure around a same centre of articulation, which makes it possible not to increase the number of fastenings to the upper part of the helicopter structure. But it remains possible for the upper or lower ends of a diagonal bar and of the corresponding tension bar inclined towards each other to be each articulated directly on the transmission box or the structure by one of the two separate ball joints respectively.

Each tension bar may be radially external to the corresponding diagonal bar, relative to the rotor axis, in which case it is to advantage for the corresponding lever to be articulated by its upper end on the upper end part of the tension bar and/or on the transmission box.

But it is also possible for each tension bar to be radially internal to the corresponding diagonal bar, relative to the rotor axis, in which case it is to advantage for the corresponding lever to be articulated by its upper end on the upper end of the corresponding diagonal bar, substantially above the articulations of said lever on said box and on the upper end of said tension bar.

According to a version, which is to advantage straightforward, light, and economical although remaining effective, at least one tension bar, but preferably each of them, includes a composite belt comprising a coil of unidirectional rovings of stiffener fibres agglomerated into a rigidified synthetic resin matrix, the composite belt surrounding two articulation ball joint supports at the ends of the tension bar for its articulation on the transmission box and on a structural support of the helicopter structure.

In a first example of a composite tension bar, the two ball joint supports are separated from each other by at least one filling component made of a light, cellular or foam material, also surrounded by the composite belt, this belt and the filling component or components being covered, between the two end ball joints, in a composite coating including at least one layer of stiffener fibres rigidified by a synthetic resin.

For safety reasons, in this case, it is advantageous for the transmission box to have, projecting outwards and in the vicinity of the articulation of each tension bar on said box, at least one crash stop, limiting the movement of the transmission box towards the helicopter structure by this crash stop pressing against an area of the corresponding lever wherein this lever is articulated on the upper end of the corresponding diagonal bar.

Thus, the crash stops allow crashing forces to be passed to the diagonal bars.

Likewise, as a safety measure against the dangers of the tension bars breaking, it is advantageous for the transmission box to have, projecting outwards and in the vicinity of the articulation of each tension bar on this box, at least one other stop or flight stop, allowing the flight forces to be passed through the corresponding diagonal bar in the event of the corresponding tension bar failing, by pressing against a corresponding lever area in the vicinity of said articulation.

In another version, wherein the composite tension bar performs the functions of take up of flight forces in the event of its composite and anti-crash belt failing, each of the two end ball joints of the tension bar is to advantage mounted in one end of one of two telescopic coaxial shafts respectively, at least one of which is tubular, and fitted into each other by their other end, between two rectilinear strands of the composite belt of this tension bar, with a telescopic travel of the two shafts which is limited, in both directions, by at least two stops, at least one of which is a crash stop, limiting the depth to which the two shafts can penetrate each other, and another stop of which limits the extent to which one shaft can withdraw from the other, in the event of the composite belt failing.

In a straightforward and practical version example, one of the two shafts has to advantage, in their fitted parts, at least one stop pin projecting substantially radially relative to the common axis of the shafts, which is the longitudinal axis of the tension bar, this stop pin being engaged in at least one oblong and axial aperture provided in the other shaft and the axial ends of which constitute one a compression and crash stop and the other an extension stop by engagement with the stop pin. Furthermore, to improve the crash resistance of the device, one of the two shafts has to advantage moreover a radial shoulder constituting a crash stop against which the other shaft comes to press after a pre-specified travel of one of the shafts pushing down into the other from an initial position.

Thus, the tension bar recovers the flight forces through the composite belt in normal operation and through the coaxial shafts and the stop of the oblong aperture in the event of the composite belt failing, and furthermore, the two coaxial shafts provide the anti-crash function, the corresponding diagonal bar transmitting only dynamic forces in normal operation.

To advantage, only one lever, but preferably each of them, includes two rigid flanges parallel to each other and substantially to the rotor axis, braced at least by a part of the corresponding damping weight and between which extend pivot pins of the articulations of this lever on the tension bar and on the diagonal bar, pivot pins being mounted on the flanges by twin bearings which may be laminated and conical, or preferably cylindrical, since the pivot connections between the lever and the transmission box, on the one hand, and the lever and the diagonal bar, on the other hand, are only acted upon by dynamic forces.

In this case, at least one diagonal bar, but preferably each of them, is articulated on the two flanges of the corresponding lever by a combined ball joint and cylindrical or conical twin bearing articulation, the ball joint at the upper end of this diagonal bar being passed through by a pivot pin mounted on the flanges by this twin bearing.

In the two examples of composite tension bar given above, it is possible for the upper end of the tension bar to be articulated in a clevis of the transmission box by a ball joint passed through by a pin locked on this clevis, and the corresponding rigid lever is articulated by pivoting around this pin on the same clevis. In this case, and when the rigid lever includes two parallel flanges, it is advantageous for the pivot pin of the lever on said clevis and on the tension bar to be mounted on the two lever flanges by a cylindrical or conical twin bearing.

When the composite tension bar includes two telescopic shafts, it is advantageous for the lower end of the corresponding diagonal bar to be articulated at least pivoting on the one of the two telescopic shafts of the tension bar which is articulated by the ball joint of the lower end of this tension bar on the helicopter structure.

In this case, it is possible for the corresponding rigid lever to be orientated substantially along the longitudinal axis of the corresponding tension bar and to support the corresponding damping weight in the direction of the lower ends of the corresponding tension bar and diagonal bar, relative to the articulation of this lever on the tension bar, around a displaced pivot pin, substantially along the longitudinal axis of this tension bar, relative to the articulation ball joint of the tension bar on the transmission box, and the articulation of the corresponding diagonal bar on this lever being thrown off centre relative to the longitudinal axis of the lever.

Each diagonal bar of a conventional suspension device can thus be replaced by an articulated assembly including a diagonal bar, a tension bar, a lever and a damping weight, so as to convert the conventional suspension device into an improved device according to the invention.

To avoid unwanted torques being introduced in the bars, it is then advantageous for the centres of articulation of the lower ends of the tension bar on the structure and of the corresponding diagonal bar on the tension bar and the centre of articulation of the corresponding diagonal bar on the corresponding rigid lever to be aligned in a first direction, and for the intersection of this first direction with a plane passing through the centre of gravity of the corresponding damping weight and transverse to this rigid lever to be aligned statically with the centres of articulation of the upper end of this tension bar on the transmission box and of this lever on this tension bar.

Generally speaking, the tension bars are not restricted, in their manufacture, to the above-mentioned composite structures, but at least one of them and preferably each of them, may include at least one portion which is able to bend resiliently under a tensile load applied to the ends of the bar, such as a ring and/or an axial portion of progressively open-ended cross-section, giving said bar a flexibility in tension.

Other advantages and characteristics of the invention will emerge from the description given below, in a non-restrictive way, of version examples described by reference to the appended drawings in which:

FIG. 1 is a diagrammatic side elevation half-view of a first version of the suspension device according to the invention, FIG. 2 is a half-view similar to FIG. 1 of a second version of the suspension device, FIG. 3 is a side elevation view, with a part removed, of a part of an example of a suspension device according to the version in FIG. 1, FIG. 4 is a sectional view along IV—IV in FIG. 3, FIG. 5 is a view similar to FIG. 3 of another example of a device according to a variant of the version in FIG. 1, FIG. 6 is a view similar to FIG. 5 of another version, and FIGS. 7 and 8 are diagrammatic views, in side elevation, of variants of tension bars which can be used in the suspension devices of the invention.

In FIGS. 1 and 2, the primary structure of the fuselage of a helicopter has been shown diagrammatically as 1, at the level of a transmission support platform defined by this primary structure 1 above the helicopter cabin, to support a power unit (not shown), a main transmission box 2 and a main rotor 3, the blades 4 of which are connected to a hub 5 rotating integrally with a rotor mast 6 rotated, around its longitudinal axis, which is the axis of rotation ZZ of the rotor, by its base in the transmission box 2, provided as a reduction gear box in the kinematic chain between the power unit and the mast 6, to rotate the rotor 3.

The rotor 3 and the transmission box 2 are suspended on the structure 1 by a suspension device 7 or 7' which filters the surge excitations (along ZZ) and the excitations due to the forces and moments in the rotor plane 3. This suspension device 7 or 7' includes, like the similar device described in FR 2 669 982, an assembly of four rigid diagonal bars 8 or 8', which are rectilinear and the longitudinal axis XX of each of which extends substantially in one of four radial half-planes respectively passing through the axis ZZ and distributed around this axis ZZ (at 90° to each other), so that two half-planes are orientated forwards and towards the sides of the helicopter, and the two other half-planes are orientated backwards and towards the sides, the four half-planes being thus each inclined by about 45° on the longitudinal axis of the helicopter. The bars 8 or 8' are inclined in these half-planes so as to converge towards each other, in the direction of their upper end, towards a focusing point located substantially on the axis ZZ, beneath the hub 5.

The lower end of each diagonal bar 8 or 8' is articulated on the structure 1 by means of a ball joint 9 passed through by a pin substantially perpendicular to the radial half-plane containing the axis XX of the bar 8 or 8' and retaining the ball joint 9 between the two fastener flanges of a structural fitting 10 of the structure 1.

Each diagonal bar 8 or 8' is connected in an articulated way by its upper end to the upper part of the housing of the transmission box 2, by an articulation 11 or 11' articulating the bar 8 or 8' at least pivoting, around an axis substantially perpendicular to the radial half-plane containing the axis XX of the bar 8 or 8', on the upper part of a rectilinear rigid lever 12 or 12' placed longitudinally on the periphery of the transmission box 2 and the longitudinal axis W of which is substantially parallel to the axis ZZ in the same radial half-planes containing the axis XX of the diagonal bar 8 or 8', and which supports a damping weight 13 or 13' at its lower end, whereas, by its upper end part, the lever 12 or 12' is articulated by an articulation 14 or 14' between the two flanges of a clevis 15 or 15' projecting radially on the upper part of the transmission box 2 so as to be able at least to pivot around an axis substantially perpendicular to the radial plane containing the axes XX and VV of the diagonal bar 8 or 8' and of the lever 12 or 12'.

The essential special feature of the anti-vibration or anti-resonance suspension device of the invention is that it includes, for each diagonal bar 8 or 8', a tension bar 16 or 16', flexible in tension and rectilinear, the longitudinal axis YY of which extends substantially in the radial plane containing the longitudinal axes XX and VV of the corresponding bar 8 or 8' and lever 12 or 12'. The tension bars 16 or 16' are also inclined on the axis ZZ so as to converge towards each other in the direction of their upper ends, by which the bars 16 or 16' are each articulated directly in a clevis 15 or 15' of the upper part of the transmission box 2 by a ball joint 18 of the articulation 14 or 14' locked between the fastener flanges of this clevis 15 or 15', whereas the lower end of each tension bar 16 or 16' is articulated on the structure 1 by a ball joint articulation 17 passed through by a pin locking it between the fastener flanges of the same structural fitting 10 as the one locking the articulation ball joint 9 of the lower end of the corresponding diagonal bar 8 or 8', on the structure 1.

Each mono-directional anti-resonance damper, constituted by a lever 12 or 12' with its damping weight 13 or 13', is thus articulated on the upper end part of the corresponding tension bar 16 or 16', at least pivoting around an axis substantially perpendicular to the corresponding radial plane, containing the axes XX, YY and VV of the bars 8 or 8' and 16 or 16' and of the lever 12 or 12'.

In FIG. 1, each tension bar 16 is substantially parallel to the corresponding diagonal bar 8 and placed radially outside this diagonal bar 8, relative to the axis ZZ, and the lower ends of the bars 8 and 16 are articulated directly on a same structural fitting 10 by the different ball joints 9 and 17. By the articulation 14, the corresponding lever 12 is articulated by its upper end on the upper end of the tension bar 16 and on the clevis 15 of the transmission box 2, above the articulation 11 of the lever 12 on the upper end of the diagonal bar 8.

But, as shown in FIG. 2, in which the same references denote similar components, each tension bar 16' may be radially inside the corresponding diagonal bar 8' relative to the axis ZZ, and the corresponding lever 12' is then articulated in 11' by its upper end on the upper end of the diagonal bar 8', substantially above the articulation 14' by which the lever 12' is articulated in the clevis 15' of the box 2 and on the upper end of the tension bar 16'.

In this configuration too, wherein the two corresponding bars 8' and 16' are substantially inclined towards each other in the direction of their upper ends, but could be substantially parallel to each other, or else inclined towards each other in the direction of their lower ends as in the examples described below with reference to FIGS. 5 and 6, the lower ends of the bars 8' and 16' are articulated by two different ball joints 9 and 17 on a same structural fitting of the structure 1.

In devices according to FIGS. 1 and 2, the tension bars 16 or 16' transmit static and dynamic forces. Dynamic forces are transmitted by the diagonal bars 8 or 8' to the damping weights 13 or 13'. The damping weights thus acted upon develop, by means of their lever 12 or 12' on the devises 15 or 15', on which the levers 12 or 12' are articulated, dynamic forces opposite to the dynamic reactions applied on these devises 15 or 15' by the dynamic loadings transmitted by the diagonal bars 8 or 8' and coming from the rotor 3 and from the transmission box 2, so as to filter these excitations.

As a safety measure, provision is made in the examples in FIGS. 1 and 2, for anti-crash stops 19a and 19'a, which project substantially radially outwards on the upper part of the transmission box 2 and each one opposite the upper end part of a corresponding lever 12 or 12'.

In FIG. 1, each stop 19a is below the two flanges of a clevis 15, opposite the upper part of the corresponding lever 12 which extends between its articulations 14 and 11 on the upper parts of the tension bar 16 and of the diagonal bar 8, and in the vicinity of these articulations 14 and 11, whereas in FIG. 2, the stop 19'a is above the flanges of a clevis 15' and opposite a protuberance, projecting radially toward the axis ZZ, on the upper end of the lever 12' substantially radially internal to two articulations 11' and 14' of the lever 12' on the upper ends of the diagonal bar 8' and of the tension bar 16'.

In both cases, the stops 19a or 19'a act to limit the movements of the rotor 3 and of the transmission box 2 towards the helicopter structure 1, in the event of a crash of the latter, by the stops 19a or 19'a engaging against the upper part of the levers 12 or 12' in their articulation areas on the upper ends of the diagonal bars 8 or 8' through which the crash forces pass, since the tension bars 16 and 16' are designed to work only in tension and not in compression.

Other stops 19b or 19'b are also provided projecting substantially radially outwards on the upper part of the transmission box 2. In FIG. 1, each stop 19b is above the corresponding stop 19a and opposite a protuberance, projecting radially towards the axis ZZ, on the upper end of the lever 12, substantially radially inside the articulation 14 of the lever 12 on the upper end of the tension bar 16. In FIG. 2, each stop 19'b is beneath the corresponding stop 19'a and clevis 15' and opposite the part of the lever 12' which extends under the articulation 14' of the lever 12' on the clevis 15' and on the upper end of the tension bar 16'.

In the event of the bars 16 and 16' rupturing, these stops 19b and 19'b engage with areas of the levers 12 and 12' which are close to the articulations 14 and 14'.

These stops 19b and 19'b thus constitute failure stops of the tension bars 16 and 16', and allow flight forces to be passed through the diagonal bars 8 and 8' in the event of the bars 16 and 16' failing.

For each lever 12 or 12', the corresponding anti-crash stop 19a or 19'a and flight stop 19b or 19'b are moved away from each other substantially in the direction of the rotor axis ZZ and on either side of the articulation 14 or 14' of the lever 12 or 12' on the corresponding clevis 15 or 15' of the transmission box 2.

The example in FIGS. 3 and 4, which corresponds to the configuration in FIG. 1, combines a metal diagonal bar 8, for the transmission of dynamic forces, with a first tension bar example 16 essentially made of composite materials, for the transmission of flight forces. This tension bar 16 includes two upper 18 and lower 17 end ball joints which are each crimped into a corresponding support, constituted by a shouldered socket 20, at each end of a elongated block 21 of a low density synthetic foam or cellular material, constituting a filling component. The filling component 21 and the two sockets 20, containing the ball joints 17 and 18, are surrounded by a composite belt 22 constituted by a coil of R type unidirectional glass fibre rovings compressed into a matrix constituted by a rigidified permeating synthetic resin, with a fibre content in the coil of about 25% for example. The use of rovings of glass stiffener fibres of the E type or S type is also possible. Between the two ball joints 17 and 18, the assembly constituted by the filling component 21 and by the two rectilinear parallel and opposite strands 22a of the belt 22 which surrounds it is stabilised by a composite coating 23 including two superposed plies of a glass fibre fabric which are crossed for example at about ±30°, i.e. such that the orientations of the warp yarn of the two plies of fabric are inclined by about 30° on one side for one ply and by about 30° on the other side for the other ply relative to the longitudinal axis YY of the tension bar 16, to which this composite structure gives good flexibility in tension, these two plies of fabric being compressed together and to the underlying structure of the component 21 and the belt 22 by a rigidified permeating synthetic resin, which is preferably the same resin as that in the belt 22 or a resin compatible with it.

This composite tension bar 16 is placed, substantially parallel to the corresponding diagonal bar 8, between the clevis 15 of the transmission box 2 and the structural fitting 10 on which the bar 16 is articulated by its lower ball joint 17 passed through by a lock pin 24 between the two flanges of this fitting 10, between which is also fixed the lock pin 25 of the ball joint 9 at the lower end of the bar 8, the two pins 24 and 25 being substantially perpendicular to the radial plane containing the axes XX and YY of the bars 8 and 16. The ball joint 18 of the upper end of the bar 16 is passed through by a lock pin 26 of this ball joint 18 on the two flanges of the clevis 15, this pin 26 constituting simultaneously in the articulation 14 (see FIG. 1) the pivot pin of the corresponding rigid lever 12 on these same flanges of the clevis 15.

In this example, as in those in FIGS. 5 and 6 described below, the lever 12 combined with the bars 8 and 16 is constituted by two rigid flanges 29 substantially parallel to each other and to the radial plane containing the longitudinal axes XX, YY and VV of the bars 8 and 16 and of the lever 12, these two flanges 29 being integral with each other via braces, and particularly, in the direction of their end carrying the damping weight 13, by the central part of this weight 13 which is fixed on the corresponding ends of the two flanges 29 by two bolts 30. On either side of the articulations 11 and 14 of the bars 8 and 16 on the lever 12, the flanges 29 are also fixed by braces such as 31, placed between the flanges 29 and fixed to the latter by bolts 32 passing through them. Between the flanges 29 also extend the pin 26 of the articulation 14 of the lever 12 and of the tension bar 16 on the flanges of the clevis 15 of the box 2 as well as a pin 27 of the combined ball joint 28 and twin bearing 33 articulation 11 of the diagonal bar 8 on the two flanges 29. The pins 26 and 27 are parallel to each other and perpendicular to the radial plane containing the longitudinal axes XX, YY and VV of the bars 8 and 16 and of the lever 12, and these pins 26 and 27 are pivot pins each mounted on the flanges 29 by a laminated and conical twin bearing 34 or 33. These twin bearings 33 and 34 have a well known structure and each of them includes two laminated conical bearings each comprising a tapered ring of elastomer 36 vulcanised around a tapered bearing surface of a metal central ring 37 surrounding a cylindrical part of the pin 26 or 27, the elastomer ring 36 being also vulcanised inside a tapered bearing surface of a shouldered external metal ring 38 locked in a corresponding bore of a flange 29, and the two conical laminated bearings of the twin bearing 34 are mounted in the flanges 29 internal to the two clevis 15 flanges passed through by the bolted pin 26 with interposition of shouldered cylindrical rings 39 between which are mounted the internal rings 37 and the ball joint 18 of the upper end of the tension bar 16. The two laminated conical bearings of the twin bearing 33 provide in the same way the pivoting mounting of the flanges 29 around the ends of the pin 27, which is bolted on the flanges 29 and which passes through the ball joint 28 at the upper end of the corresponding diagonal bar 8, this ball joint 28 being placed between the two internal rings 37 of the twin bearing 33.

However, as the pivoting connections around the pin 26, between the flanges 29 of the lever 12 and the clevis 15 flanges, and around the pin 27, between the diagonal bar 8 and the flanges 29 of the lever 12, are acted upon only by dynamic forces, the conical laminated twin bearings 33 and 34 can be replaced, as a variant, by smooth and cylindrical twin bearings, with rings having preferably an anti-friction coating, for example in PTFE fabric, which cuts costs still further relative to similar prior art devices.

In FIG. 3 as in FIG. 1, the lever 12 can abut by the part of its flanges 29 which extends between the articulations 11 and 14 against an anti-crash stop such as 19a in FIG. 1, so as to protect the tension bar 16 from compression, since this bar 16 is designed to work only in tension. In the event of the belt 22 of the tension bar 16 failing, the flight forces pass through a stop such as 19b in FIG. 1, the stops 19a and 19b not being shown in FIG. 3 so as not to overload the drawing.

FIG. 5 shows a second example substantially according to the configuration in FIG. 1, and which can be distinguished from the first example in FIGS. 3 and 4 by three essential differences, relative to the structure of the composite tension bar 16", to the fact that this bar 16" and the corresponding diagonal bar 8" are no longer substantially parallel but inclined towards each other in the direction of their lower ends, and lastly to the articulation of the lower end of the diagonal bar 8" no longer directly on a structural support such as 10 in FIGS. 1 and 2, but on the lower end part of the tension bar 16", which remains articulated by its lower end ball joint 17 on a structural fitting of the structure 1.

As regards the structure of the tension bar 16", this bar comprises a composite belt 22, identical to the one in the previous example, and which surrounds the supports of the ball joints such as 17 and 18 at the lower and upper ends of the bar 16". Each of these two ball joints is mounted in a corresponding lower 41 or upper end 42 clevis each having an external groove 43 in which is housed the composite belt 22 previously constituted and rigidified, for example by polymerisation, if the resin agglomerating the rovings of the stiffener fibres is a thermosetting resin, for example of the epoxy type. Each of the two end devises 41, 42 is at one end of one of two coaxial tubular shafts 44 and 45 respectively fitted into each other by their other end, and telescopic over a limited travel in both directions. More exactly, the clevis 41 of the lower end ball joint 17 is shaped at the lower end of an external tubular shaft 44 in which is fitted coaxially, along the axis YY, the lower end and the major part of the length of an internal tubular shaft 45, the upper end of which is shaped into a clevis 43 receiving the ball joint 18 of the upper end of this tension bar 16". The parts of the two shafts 44 and 45 fitted into each other have two sliding guide areas, constituted by anti-friction coatings 46 and 47 made by layers of a PTFE fabric coiled and fixed around the lower and upper ends of the part of the internal shaft 45 which is engaged in the external shaft 44. In the parts of the shafts fitted into each other, and in the vicinity of the upper end of the internal shaft 45, the external shaft 44 is integral with a diametrical stop pin 48 which passes through two oblong ports 49 provided axially in diametrically opposite parts of the internal shaft 45. In the initial and normal operating position of the tension bar 16", the two shafts 44 and 45 are fitted into each other with the result that the pin 48 of the external shaft 44 is not in contact with any end of the ports 49 of the internal shaft 45. In the event of the composite belt 22 failing, the telescopic sliding of the two shafts 44 and 45 occurs in the extension direction, the internal shaft 45 tending to withdraw from the external shaft 44, until the pin 48 abuts against the lower end 49a of the oblong ports 49. This end 49a of the ports 49 thus constitutes an extension stop, or for take up of the flight forces by the bar 16" in the event of the belt 22 rupturing, whereas the upper end 49b of the ports 49 constitutes a compression and anti-crash stop, limiting the depth to which the two shafts 44 and 45 penetrate into each other and protecting the tension bar 16" against compression. In the event of the stop pin 48 breaking when pressing against the upper end 49b of the oblong ports 49, the tension bar 16" is protected against crashing by a second anti-crash or anti-crash stop, constituted by a shoulder 50 projecting radially outwards on the upper end part of the internal shaft 45, and against which the upper end of the external shaft 44 abuts.

Thus, the anti-crash and flight forces take up functions, in the event of the composite belt 22 failing, are integrated in the tension bar 16" in FIG. 5. In this example, the damping weight 13 is supported by a lever 12 including two flanges 29 as in the example in FIGS. 3 and 4, and which are articulated, on the one hand, at the upper end of the diagonal bar 8", by a complex articulation 11 with ball joint 28 and cylindrical or conical and laminated twin bearing, around a pin 27, and, on the other hand, on the upper end of the tension bar 16" and on the clevis 15 flanges of the box 2 by a cylindrical or conical and laminated twin bearing surrounding a pivot pin 26 passing through the ball joint 18 of the upper end of the bar 16", in the same way as shown in FIG. 4.

As mentioned above, the lower end of the diagonal bar 8", dimensioned to transmit only dynamic forces in normal operation, is articulated on the lower end part of the external shaft 44, by an articulation pivoting around a pin 51 substantially perpendicular to the radial plane containing the longitudinal axes XX, YY and VV of the bars 8" and 16" and of the lever 12, this pin 51 being centred on the longitudinal axis XX of the bar 8", between the pins 27 and 24 providing the locking respectively of the ball joint 28 of the upper end of the bar 8" on the lever 12 and of the ball joint 17 of the lower end of the bar 16" between two fastener flanges of a structural fitting such as 10 (FIGS. 1 and 2). For this reason, the lower part of the diagonal bar 8" is shaped into a clevis or U-shape, the two branches of which extend on either side of the lower part of the external shaft 44 and are connected to this shaft 44 by a connection pivoting around the pin 51 with possibly a cylindrical or conical twin bearing such as 33 in FIG. 4. The alignment of the pins 27, 51 and 24 in a same plane passing through the longitudinal axis XX of the bar 8" allows for unwanted moments not to be introduced in the tension bar 16".

As a variant, the lower end of the bar 8" may be articulated by a connection pivoting around the pin 24 passing through the ball joint 17 articulating the lower end of the bar 16" on the structure 1.

According to another variant, similar to FIG. 2, the bar 8", although inclined towards the bar 16" in the direction of its lower end, is directly articulated on a structural support of the fuselage by a ball joint at its lower end.

The example in FIG. 6 is a variant of the one in FIG. 5, and comprises also a tension bar 16" with two telescopic shafts (44, 45) supporting the articulation ball joints 17, 18 at their ends and integrating an anti-crash stop 50, as described above with reference to FIG. 5. Likewise, the example in FIG. 6 comprises a diagonal bar 8" inclined towards the tension bar 16" in the direction of its lower end by which the diagonal bar 8" is articulated pivoting around the pin 51 on the lower end part of the bar 16", whereas the upper end of the bar 8" is articulated by a complex articulation 11 with ball joint and cylindrical or conical twin bearing, around a pin 27, between the two flanges 29" of a lever 12" supporting a damping weight 13".

Suffice it now therefore to describe below the main differences of the example in FIG. 6 compared with the one in FIG. 5.

The lever 12" is orientated substantially along the longitudinal axis YY of the bar 16" (the axis common to the telescopic shafts 44 and 45 of this bar 16"), so that this bar 16" and the bar 8" extend substantially between the two flanges 29" of the lever 12", which supports the damping weight 13" subdivided into two halves 13"a and 13"b each bolted on the flanges 29", on either side of the two rectilinear strands 22a of the composite belt 22 of the bar 16", with a clearance (transversally to the longitudinal axes XX and YY of the bars 8" and 16") which allows relative angular displacements of the half-weights 13"a and 13"b and of the flanges 29" of the lever 12" relative to the two bars 8" and 16". The damping weight 13" is supported in the direction of the lower ends of the bars 8" and 16" relative to the articulation of the lever 12" on the bar 16" which is no longer an articulation pivoting around the pin 26 locking the ball joint 18 of the upper end of the bar 16" on the clevis 15 flanges, as in FIG. 5, but which is an articulation pivoting on the upper end part of the upper and internal shaft 45, of the tension bar 16", around a pivot pin 52 parallel to the pivot pin 51 and moved substantially along the longitudinal axis YY of the bar 16", from the pin 26 towards the pin 24 at the other end of the bar 16", and simultaneously moved slightly off centre relative to the longitudinal axis YY of the bar 16", in the direction of this axis turned towards two lugs 29"a of the flanges 29" forming a clevis inside which the ball joint 28 of the upper end of the bar 8" is locked by the pin 27, and so thrown off centre relative to the longitudinal axis VV of the lever 12". Furthermore, as in FIG. 5, the articulation pins 24, 51 and 27 are centred on the longitudinal axis XX of the bar 8", so that the centres of the articulations of the bar 8" on the lever 12" and on the bar 16" and of the bar 16" on the structure are aligned on a same direction given by the longitudinal axis XX of the bar 8". Moreover, the pin 52 of the pivoting articulation of the lever 12" on the bar 16" is positioned and the weight 13" is arranged so that the point I, at the intersection of the longitudinal axis XX of the bar 8" with the plane αα perpendicular to the longitudinal axis of the lever 12" and passing through the centre of gravity of this weight 13", is a point aligned with the centres of the articulations at the levels of the pins 52 and 26, on a second direction inclined on the longitudinal axis XX of the bar 8", in the static position. This particular geometric arrangement avoids loading the articulation of the pin 26 by moments likely to introduce unwanted forces.

The articulated assembly in FIG. 6 may be substituted to a similar assembly of a prior art anti-resonance suspension device, since this assembly is articulated by the ball joints 17 and 18 at the lower and upper ends of the tension bar 16" on the available fasteners, on the one hand, on the helicopter structure, on the other hand, on the transmission box 2, since the corresponding diagonal bar 8" is articulated between the lever 12" and the tension bar 16", and this lever 12" is also articulated, at its end opposite the damping weight 13", on the tension bar 16".

In the devices in FIGS. 1 to 6, the metal or composite tension bars 16, 16', or 16" are rectilinear with essentially rectilinear edges.

But, as shown in FIGS. 7 and 8, other version variants are possible to obtain the required tensile flexibility.

In particular, the tension bar 55 in FIG. 7 may also comprise a circular or oval ring 56, able to resiliently bend radially, and with which are integral two radial and diametrically opposite small tension rods 57, rigid or flexible in tension, and equipped at their free end with articulation ball joints 58 similar to the ball joints 17 and 18 in the previous examples, so that by tension on the rods 57, the ring 56 is deformed and gives the bar 55 the required tensile flexibility.

As a variant, the tension bar 59 in FIG. 8 is a bar of rectilinear axis the edges 60 of which are undulating between its two ends fitted with articulation ball joints 61, so that the bar 59 has successive axial portions 62 of progressively open-ended and repeated cross section, giving the bar 59 its tensile flexibility under resilient axial bending.

In the different examples described above, it may be noted that the support lever of the damping weight may be orientated substantially in any direction within the angle defined between the direction vertical or parallel to the axis ZZ and the axis YY of the tension bar in the radial plane passing through the longitudinal axes of the two corresponding diagonal and tension bars. Furthermore, the centre of the articulation of the lower end of the corresponding diagonal bar is not subjected to any constraint as regards its position in the corresponding radial plane, subject to structure complications which may result in order to articulate the diagonal bar appropriately either independently and directly on the structure, or around the same centre of articulation as the lower end of the corresponding tension bar on the structure, or again on the lower end part of the corresponding tension bar, by means of articulation devises the shapes of which may be complex.

I claim:

1. An anti-vibration suspension device, for a helicopter main rotor including a rotor mast rotated by a main transmission box around an axis of the mast, which is the axis of rotation of the rotor, the suspension device including at least three rigid diagonal bars supporting the transmission box on the helicopter structure, the diagonal bars being distributed around the transmission box and inclined on the rotor axis so as to converge in the direction of their upper ends towards each other and substantially towards a point of the rotor axis, the diagonal bars being connected in an articulated way, on the one hand, to the helicopter structure by their lower ends, and, on the other hand, to the transmission box by their upper ends and by means of rigid levers, equal in number to the diagonal bars, each lever pointing substantially from the top of the transmission box and from the upper end of the corresponding diagonal bar towards the base of said box and/or the lower end of said diagonal bar, each lever supporting at least one damping weight at its lower end and being connected in an articulated way to the transmission box by its upper end part, on which the upper end of the corresponding diagonal bar is articulated, the articulations connecting each lever to said box and to the corresponding diagonal bar being articulations at least pivoting around axes substantially perpendicular to a corresponding radial plane passing through the rotor axis and through the longitudinal axis of the corresponding diagonal bar, wherein, for each diagonal bar a tension bar, flexible in tension, is also inclined on the rotor axis in the corresponding radial plane so that the tension bars converge towards each other in the direction of their upper ends, each tension bar being articulated by its upper end on the transmission box and by its lower end on the helicopter structure, and the corresponding lever is connected in an articulated way to said box while being articulated, at least pivoting, around an axis substantially perpendicular to said corresponding radial plane, on the upper end part of the tension bar.

2. A suspension device according to claim 1, wherein each tension bar is substantially parallel to the corresponding diagonal bar.

3. A suspension device according to claim 1, wherein each tension bar and the corresponding diagonal bar are inclined towards each other in the direction of one of their ends.

4. A suspension device according to claim 1, wherein each tension bar is radially outside the corresponding diagonal bar, relative to the rotor axis, and the corresponding lever is articulated by its upper end on the upper end part of the tension bar and on the transmission box.

5. A suspension device according to claim 1, wherein each tension bar is radially inside the corresponding diagonal bar, relative to the rotor axis, and the corresponding lever is articulated by its upper end on the upper end of the corresponding diagonal bar, substantially above the articulations of said lever on said box and on the upper end of said tension bar.

6. A suspension device according to claim 1, wherein at least one tension bar includes a composite belt comprising a coil of unidirectional rovings of stiffener fibres agglomerated in a rigidified synthetic resin matrix, the composite belt surrounding two articulation ball joint supports at the ends of the tension bar for the articulation of said tension bar on the transmission box and on a structural support of the helicopter structure.

7. A suspension device according to claim 6, wherein the two ball joint supports are separated from each other by at least one filling component made of a light, cellular or foam material, also surrounded by the composite belt, said belt and said filling component being covered, between the two end ball joints, by a composite coating including at least one layer of stiffener fibres rigidified by a synthetic resin.

8. A suspension device according to claim 6, wherein each of the two end ball joints of at least one tension bar is mounted in one end of one of two telescopic coaxial shafts respectively, at least one of which is tubular, and fitted into each other by their other end, between two rectilinear strands of the composite belt of the tension bar, with a telescopic travel of the two shafts which is restricted, in both directions, by at least two stops at least one of which is an anti-crash stop, restricting the depth to which the two shafts can penetrate each other, and another stop of which restricts the extent to which one shaft can withdraw from the other, in the event of the composite belt failing.

9. A suspension device according to claim 8, wherein one of the two shafts has, in their fitted parts, at least one stop pin projecting substantially radially relative to the common axis of the shafts which is the longitudinal axis of the tension bar, the stop pin being engaged in at least one oblong and axial aperture provided in the other shaft, and the axial ends of which constitute one a compression and anti-crash stop and the other an extension stop by engagement with the stop pin.

10. A suspension device according to claim 8, wherein one of the two shafts has a radial shoulder constituting an anti-crash stop against which the other shaft is supported after a pre-specified travel of one of the shafts pushing down into the other from an initial position.

11. A suspension device according to claim 1, wherein at least one lever includes two rigid flanges parallel to each other and substantially to the rotor axis, braced at least by a part of the damping weight, and between which extend pivot pins of the articulations of said lever on the tension bar and on the diagonal bar, the pivot pins being mounted on the flanges by twin bearings.

12. A suspension device according to claim 11, wherein at least one diagonal bar is articulated on the two flanges of the lever by a combined ball joint and twin bearing articulation, the ball joint at the upper end of said diagonal bar being passed through by a pivot pin mounted on said flanges by said twin bearing.

13. A suspension device according to claim 11, wherein the upper end of at least one tension bar is articulated in a clevis of said box by a ball joint passed through by a pin retained on said clevis, and the corresponding rigid lever is articulated by pivoting around said pin on the same clevis.

14. A suspension device according to claim 13, wherein the pivot pin of the lever on said clevis and on the tension bar is mounted on the two flanges of the lever by a twin bearing.

15. A suspension device according to claim 1, wherein the lower ends of at least one diagonal bar and of the corresponding tension bar are articulated on the structure by two different ball joint articulations.

16. A suspension device according to claim 1, wherein the lower end of one of the diagonal bar and corresponding tension bar respectively is articulated on the structure at least pivoting around a pivot pin passing through a ball joint articulating the lower end of the other of said tension bar and corresponding diagonal bar on the structure.

17. A suspension device according to claim 8, wherein the lower end of at least one diagonal bar is articulated at least with a pivot on the shaft of the two telescopic shafts of the tension bar which is articulated by the ball joint of the lower end of said tension bar on the helicopter structure.

18. A suspension device according to claim 17, wherein at least one rigid lever is directed substantially along the longitudinal axis of the corresponding tension bar and supports the corresponding damping weight in the direction of the lower ends of the corresponding tension bar and diagonal bar, relative to the articulation of said lever on said tension bar, around a pivot pin shifted, substantially along the longitudinal axis of said tension bar, relative to the articulation ball joint of said tension bar on said box, and the articulation of the corresponding diagonal bar on said lever being thrown off centre relative to the longitudinal axis of said lever.

19. A suspension device according to claim 18, wherein the centres of articulation of the lower ends of at least one tension bar on the structure and of the corresponding diagonal bar on the tension bar and the centre of articulation of the corresponding diagonal bar on the corresponding rigid lever are aligned on a first direction, and the intersection of this first direction with a plane passing through the centre of gravity of the corresponding damping weight and transverse to said rigid lever being aligned statically with the centres of articulation of the upper end of said tension bar on said box and of said lever on said tension bar.

20. A suspension device according to claim 1, wherein said transmission box has, projecting outwards and in the vicinity of the articulation of each tension bar on said box, at least one anti-crash stop, restricting the movement of said box towards the structure by support against an area of said corresponding lever wherein said lever is articulated on the upper end of the corresponding diagonal bar.

21. A suspension device according to claim 1, wherein said transmission box has, projecting outwards and in the vicinity of the articulation of each tension bar on said box, at least one flight stop, allowing the flight forces to be passed to the corresponding diagonal bar in the event of the corresponding tension bar failing, by support against an area of the corresponding lever in the vicinity of said articulation.

22. A suspension device according to claim 1, wherein at least one of the tension bars includes at least one portion which is resiliently deformable under a tensile load applied at the ends of the bar, such as a ring and/or an axial portion of progressively open-ended cross-section, giving said bar a flexibility in tension.

* * * * *

UNITED STATES PATENT AND TRADEMARK OFFICE
CERTIFICATE OF CORRECTION

PATENT NO. : 6,145,785  
DATED : November 14, 2000  
INVENTOR(S) : Nicolas Certain Page 1 of 1

It is certified that error appears in the above-identified patent and that said Letters Patent is hereby corrected as shown below:

<u>Title page,</u>
Item [75], Inventor: change Nic<u>h</u>olas Certain to Nicolas Certain Signed and Sealed this Twenty-fifth Day of December, 2001

Attest:

Attesting Officer

JAMES E. ROGAN
*Director of the United States Patent and Trademark Office*